US010467346B2

(12) United States Patent
Jagan et al.

(10) Patent No.: US 10,467,346 B2
(45) Date of Patent: Nov. 5, 2019

(54) METHOD AND SYSTEM FOR GENERATING NAMED ENTITIES

(71) Applicant: WIPRO LIMITED, Bangalore (IN)

(72) Inventors: Balaji Jagan, Chinnalapatti (IN); Naveen Kumar Nanjappa, Bengaluru (IN)

(73) Assignee: Wipro Limited, Bangalore (IN)

( * ) Notice: Subject to any disclaimer, the term of this patent is extended or adjusted under 35 U.S.C. 154(b) by 183 days.

(21) Appl. No.: 15/638,408

(22) Filed: Jun. 30, 2017

(65) Prior Publication Data

US 2018/0336192 A1 Nov. 22, 2018

(30) Foreign Application Priority Data

May 18, 2017 (IN) .............................. 201741017539

(51) Int. Cl.
*G06F 17/28* (2006.01)
*G06F 17/27* (2006.01)

(52) U.S. Cl.
CPC ........ *G06F 17/2863* (2013.01); *G06F 17/278* (2013.01); *G06F 17/28* (2013.01)

(58) Field of Classification Search
CPC .... G06F 17/278; G06F 17/28; G06F 17/2809; G06F 17/2836; G06F 17/2863
USPC ................... 704/2, 4, 5, 8, 277, 9
See application file for complete search history.

(56) References Cited

U.S. PATENT DOCUMENTS

| 8,560,298 B2 * | 10/2013 | Kumaran ............ G06F 17/2223 704/2 |
| 8,594,996 B2 | 11/2013 | Liang et al. |
| 9,727,639 B2 * | 8/2017 | Groeneveld .......... G06F 16/951 |
| 9,947,311 B2 * | 4/2018 | Raemy ................ G06F 17/2705 |

(Continued)

FOREIGN PATENT DOCUMENTS

WO WO 2015/080558 6/2015

OTHER PUBLICATIONS http://au-kbc.org/nlp/NER-FIRE2014/, "NER—Named-Entity Recognition Indian Languages", *IRSI*, Dec. 5-7, 2014, 5 pages.

(Continued)

*Primary Examiner* — Martin Lerner
(74) *Attorney, Agent, or Firm* — Finnegan, Henderson, Farabow, Garrett & Dunner, LLP

(57) ABSTRACT

This disclosure relates generally to natural language processing, and more particularly to system and method for generating named entities. In one embodiment, a method is provided for generating named entities. The method includes extracting a plurality of named entities in a primary language from a plurality of digital content in the primary language, transliterating each of the plurality of named entities in the primary language to a set of possible named entities in a secondary language, determining a correct named entity in the secondary language from among the set of possible named entities in the secondary language, and generating a named entity in a subsequent secondary language corresponding to the correct named entity in the secondary language. It should be noted that the plurality of named entities in the primary language are named entities in the subsequent secondary language, and the subsequent secondary language is related to the secondary language.

21 Claims, 5 Drawing Sheets

(56) References Cited

U.S. PATENT DOCUMENTS

| | | | |
|---|---|---|---|
| 2001/0025320 A1* | 9/2001 | Seng | G06F 17/2217 704/8 |
| 2008/0071518 A1* | 3/2008 | Narayanan | G06F 17/278 704/2 |
| 2008/0114583 A1* | 5/2008 | Al-Onaizan | G06F 17/2223 704/2 |
| 2008/0270111 A1* | 10/2008 | Hanumanthappa | G06F 17/2223 704/3 |
| 2009/0249182 A1* | 10/2009 | Symington | G06F 17/278 715/209 |
| 2010/0076972 A1* | 3/2010 | Baron | G06F 17/278 707/736 |
| 2011/0099000 A1* | 4/2011 | Rai | G06F 17/2223 704/2 |
| 2014/0258261 A1* | 9/2014 | Singh | G06F 16/9566 707/709 |
| 2015/0199333 A1* | 7/2015 | Nekhay | G06F 17/278 704/9 |
| 2016/0147738 A1* | 5/2016 | Geurts | G06F 17/2836 704/2 |
| 2016/0358596 A1* | 12/2016 | Singh | G06F 17/278 |
| 2017/0060835 A1* | 3/2017 | Radford | G06F 17/277 |
| 2017/0154258 A1* | 6/2017 | Liu | G06N 3/0445 |
| 2018/0174572 A1* | 6/2018 | Pino | G06F 17/289 |
| 2018/0365211 A1* | 12/2018 | Xu | G06F 17/2735 |

OTHER PUBLICATIONS

Biswas, S., et al., "A Two Stage Language Independent Named Entity Recogniton for Indian languages", *International Journal of Computer Science and Information Technologies*, vol. 1 (4), 2010, pp. 282-289.

\* cited by examiner

METHOD AND SYSTEM FOR GENERATING NAMED ENTITIES

TECHNICAL FIELD

This disclosure relates generally to natural language processing, and more particularly to method and system for generating named entities.

BACKGROUND

Named entity (NE) recognition and extraction is an important and necessary task of natural language processing (NLP) for many applications. It is employed for recognizing and extracting entities that include personal name, location, organization, etc. from a document. However, one of the primary limitations with existing NE extraction tools is that they only identify the Standard English names and locations. Typically, an enormous amount of data is required to train any NE tool to identify region specific named entities (NE's). Thus, in case of the languages other than English, it is difficult to identify and extract the NE's based on the characteristics of the languages under consideration because of non-availability of any standard NE extraction tools. In particular, for Indian languages, the identification of NE's is difficult because of its morphologically rich and partial free-word order nature.

Some of the current techniques attempt to address this problem by employing statistical method, such as maximum entropy model (MaxEnt) and hidden Markov model (HMM), for recognizing the NE's. Such techniques also employ a variety of features and contextual information for predicting various NE classes. However, such techniques are language dependent and trained for a limited number of tokens in a limited number of Indian languages. Additionally, the accuracy of such techniques is not ascertained since they predict the NE classes.

Alternatively, some of the current techniques attempt to address this problem by employing NLP, contextual data in surroundings, semantic analysis, and so forth. For examples, the entity recognition and disambiguation system (ERDS) automatically determines which entities are being referred to by the text, based upon input of a text segment, using natural language processing and analysis of information gleaned from contextual data in the surrounding text. However, such techniques are not much efficient in recognizing large volume of named entities in Indian Languages. Thus, there is no technique or tool for efficiently generating the named entities for Indian languages.

SUMMARY

In one embodiment, a method for generating named entities is disclosed. In one example, the method includes extracting a plurality of named entities in a primary language from a plurality of digital content in the primary language. The method further includes transliterating each of the plurality of named entities in the primary language to a set of possible named entities in a secondary language. The method further includes determining a correct named entity in the secondary language from among the set of possible named entities in the secondary language. The method further includes generating a named entity in a subsequent secondary language corresponding to the correct named entity in the secondary language. The plurality of named entities in the primary language are named entities in the subsequent secondary language, and the subsequent secondary language is related to the secondary language.

In one embodiment, a system for generating named entities is disclosed. In one example, the system includes at least one processor and a memory communicatively coupled to the at least one processor. The memory stores processor-executable instructions, which, on execution, cause the processor to extract a plurality of named entities in a primary language from a plurality of digital content in the primary language. The processor-executable instructions, on execution, further cause the processor to transliterate each of the plurality of named entities in the primary language to a set of possible named entities in a secondary language. The processor-executable instructions, on execution, further cause the processor to determine a correct named entity in the secondary language from among the set of possible named entities in the secondary language. The processor-executable instructions, on execution, further cause the processor to generate a named entity in a subsequent secondary language corresponding to the correct named entity in the secondary language. The plurality of named entities in the primary language are named entities in the subsequent secondary language, and the subsequent secondary language is related to the secondary language.

In one embodiment, a non-transitory computer-readable medium storing computer-executable instructions for generating named entities is disclosed. In one example, the stored instructions, when executed by a processor, cause the processor to perform operations including extracting a plurality of named entities in a primary language from a plurality of digital content in the primary language. The operations further include transliterating each of the plurality of named entities in the primary language to a set of possible named entities in a secondary language. The operations further include determining a correct named entity in the secondary language from among the set of possible named entities in the secondary language. The operations further include generating a named entity in a subsequent secondary language corresponding to the correct named entity in the secondary language. The plurality of named entities in the primary language are named entities in the subsequent secondary language, and the subsequent secondary language is related to the secondary language.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
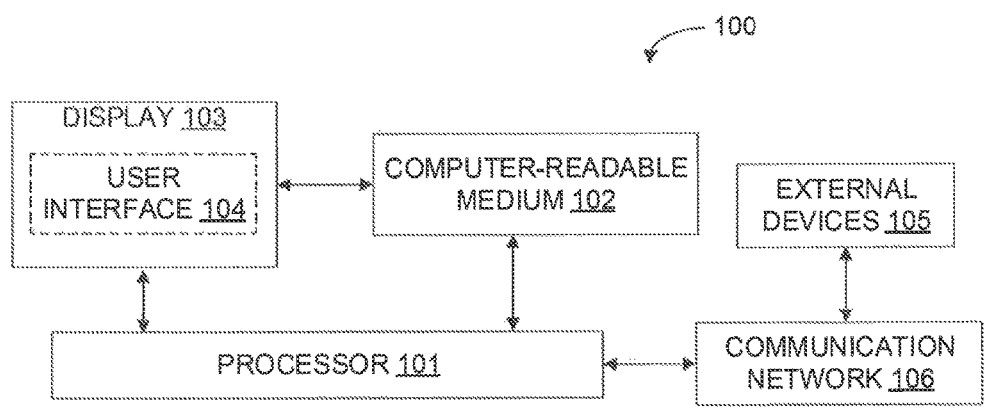
FIG. 1 is a block diagram of an exemplary system for generating named entities in accordance with some embodiments of the present disclosure.

Referring now to FIG. 1, an exemplary system 100 for generating named entities is illustrated in accordance with some embodiments of the present disclosure. In particular, the system 100 implements a named entity generation engine to generate named entities. As will be described in greater detail in conjunction with FIG. 2, the named entity generation engine extracts a plurality of named entities in a primary language from a plurality of digital content in the primary language, transliterates each of the plurality of named entities in the primary language to a set of possible named entities in a secondary language, determines a correct named entity in the secondary language from among the set of possible named entities in the secondary language, and generates a named entity in a subsequent secondary language corresponding to the correct named entity in the secondary language. It should be noted that the plurality of named entities in the primary language are named entities in the subsequent secondary language. Further, it should be noted that the subsequent secondary language is related to the secondary language.

The system 100 includes one or more processors 101, a computer-readable medium (e.g., a memory) 102, and a display 103. The computer-readable medium 102 stores instructions that, when executed by the one or more processors 101, cause the one or more processors 101 to generate named entities in accordance with aspects of the present disclosure. The computer-readable medium 102 may also store various data (e.g., digital content, named entity extraction model, extracted named entities, tagged named entities, transliteration frameworks, pre-defined mapping tables, vowels mapping table, consonants mapping table, matras mapping table, LSTM model, character level tree model, generated named entities, etc.) that may be captured, processed, and/or required by the system 100. The system 100 interacts with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
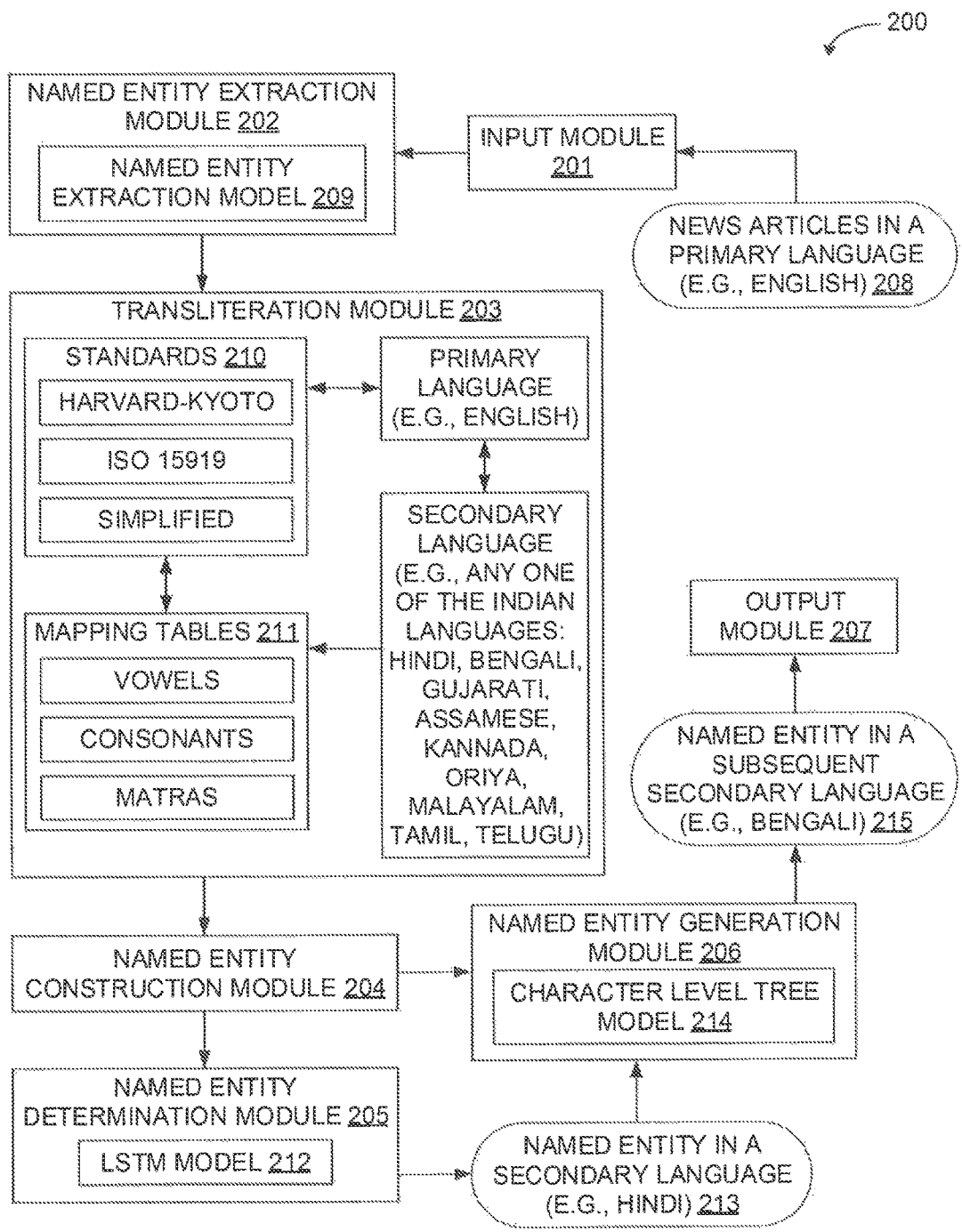
FIG. 2 is a functional block diagram of named entity generation engine in accordance with some embodiments of the present disclosure.

Referring now to FIG. 2, a functional block diagram of the named entity generation engine 200 implemented by the system 100 of FIG. 1 is illustrated in accordance with some embodiments of the present disclosure. The named entity generation engine 200 may include various modules that perform various functions so as to generate named entities. In some embodiments, the named entity generation engine 200 includes an input module 201, a named entity extraction module 202, a transliteration module 203, a named entity construction module 204, a named entity determination module 205, a named entity generation module 206, and an output module 207.

The input module 201 receives digital contents 208 in a primary language from one or more sources. The digital contents 208 may then be employed by the named entity generation engine 200 to generate named entities in a subsequent secondary language. In some embodiments, the primary language may be English while the subsequent secondary language may be any of the Indian languages (e.g., Hindi, Bengali, Gujarati, Assamese, Kannada, Oriya, Malayalam, Tamil, Telugu, Marathi, Punjabi, Konkani, etc.). It should be noted that, though the digital contents are in the primary language, they cater to a population versant with the subsequent secondary language. Thus, in some embodiments, the digital content may be English news articles catering to Indian population. For example, the digital content may be content of daily news articles. As will be appreciated, the digital contents 208 may be curated from across a plurality of genres (politics, sports, finance, natural disaster, etc.) so as to generate named entities of different domains. The named entities may include, but are not limited to, person, location, and organization.

Additionally, the digital contents 208 may be for initial training purposes, where the various named entities may be manually tagged. As noted above, the digital contents 208 for the initial training purposes may be specifically curated from across various genres so as to manually tag and train on named entities of different domains. Further, as will be appreciated, the manually tagged named entities are primary language transliteration of named entities in the subsequent secondary language (i.e., region specific named entities). For example, if the initial corpus of digital contents are about 300,000, then about 100,000 of them may be manually tagged for initial training while about 200,000 may be used for subsequent testing and updating. The tagged named entities may be provided to the input module 201 in a pre-defined format. In some embodiments, the pre-defined format may be as per the prescribed format of Open NLP standard.

The named entity extraction module 202 receives tagged or untagged digital contents 208 from the input module 201. In some embodiments, the named entity extraction module 202 may include a named entity extraction model 209 for extracting named entities from the digital contents. The named entity extraction model 209 may be an Open NLP named entity tagger tool. The named entity extraction model 209 may employ machine learning algorithms to learn and adapt in identifying named entities. The named entity extraction model 209 is initially trained with the tagged digital contents where primary language transliteration of named entities in the subsequent secondary language are tagged. During training, the named entity extraction model 209 may be trained to identify the region specific named entities (i.e., transliterated person, location and organization types) from the tagged digital contents. The trained named entity extraction model 209 is then utilized to extract the region specific named entities from untagged digital contents. Thus, the untagged digital contents may be provided to the trained named entity extraction model 209 as a test data for extracting out the named entities and to further strengthen the named entity extraction model 209.

The named entities identified or extracted by the named entity extraction model 209 may then be provided to the transliteration module 203, which in conjunction with the named entity construction module 204 transliterates each of the plurality of named entities in the primary language to a set of possible named entities in the secondary language. In some embodiments, the transliteration module 203 employs a number of predefined multi-lingual transliteration frameworks for performing the transliteration. The predefined multi-lingual transliteration frameworks may be based on one or more transliteration standards 210 including, but not limited to, Harvard-Kyoto, ISO 15919, and a simplified standard. The simplified standard may be employed so as to get the common to languages under consideration. It enables the transliteration module 203 to handle the variations of different languages. Further, in some embodiments, each of the predefined multi-lingual transliteration frameworks further includes a number of pre-defined mapping tables 211. The pre-defined mapping table includes, but is not limited to, vowels mapping table, consonants mapping table, and matras mapping table for different languages under consideration. Each of the pre-defined mapping table may include Unicode values for the mapped vowels, consonants, matras, and so forth.

The named entity construction module 204 in conjunction with the transliteration module 203 constructs the set of possible named entities in the secondary language for each of the named entities in the primary language. The named entity construction module 204 first retrieves a sequence of symbols for the primary language alphabets, from the transliteration standard 210, for each of the plurality of named entities in the primary language. The named entity construction module 204 then retrieves a sequence of symbols for the secondary language alphabets, from the mapping table 211, corresponding to or equivalent to the sequence of symbols for the primary language alphabets. The named entity construction module 204 then combines the sequence of symbols in the secondary language alphabets to generate the set of possible named entities in the secondary language. As will be appreciated, the possible combination of strings may be obtained from the transliteration module 203 for each language. Thus, for example, the transliteration module 203 in conjunction with the named entity construction module 204 transliterates the extracted named entities in the English language to a set of possible named entities in any one of the Indian language.

The possible outcomes (i.e, the set of possible named entities in the secondary language) may then be fed into the named entity determination module 205, which determines a correct named entity 213 in the secondary language from among the possible outcomes. In some embodiments, the named entity determination module 205 may include a long short term memory (LSTM) model 212 for determining the correct sequence of symbols in the secondary language alphabets. Additionally, in some embodiments, the LSTM model 212 provides the correct named entity 213 in the secondary language along with a confidence score. If the confidence score is above a pre-defined or a dynamic threshold, the output of the LSTM model 212 (i.e., the correct named entity) is considered, else the output is ignored by the named entity generation engine 200.

It should be noted that the LSTM model 212 may be trained with a large dataset comprising of a plurality of named entities of the secondary language and a plurality of corresponding transliterated named entities in the primary language. For example, the LSTM model 212 may be trained with a large dataset comprising of 20,000 natural language named entities of Hindi and its equivalent English transcriptions. Once the LSTM model 212 is trained, the set of transliterated named entities of Hindi may be fed into the LSTM model 212 to identify the best sequence.

The named entity generation module 206 receives the correct named entity 213 in the secondary language from the named entity determination module 205 as well as the set of possible named entities in the secondary language from the named entity construction module 204. The named entity generation module 206 then generates a named entity 215 in a subsequent secondary language corresponding to the correct named entity 213 in the secondary language. It should be noted that the subsequent secondary language may be related to the secondary language. Thus, for example, if the secondary language is one of the Indian language (e.g., Hindi), then the subsequent secondary language may be any of the other Indian languages (e.g., Bengali, Assamese, Gujarati, Marathi, Tamil, Oriya, Punjabi, Kannada, Malayalam, Telugu, etc.).

In some embodiments, the named entity generation module 206 may include a multi-lingual character level tree model 214, which is common to all languages being considered, for generating the named entity 215 in the subsequent secondary language. Thus, once the correct named entity 213 is identified, the equivalent index may be obtained from the character-level tree model 214 to obtain the best sequence 215 of all other subsequent languages under consideration. As will be appreciated, the multi-lingual character level tree model 214 may be continuously updated based on a learning process over a period of time. The output module 207 may then render the named entity in the subsequent secondary language 215 as well as any other intermediary output (e.g., correct named entity in the secondary language) to the user or any other connected application, process, or system.

It should be noted that the named entity generation engine 200 may be implemented in programmable hardware devices such as programmable gate arrays, programmable array logic, programmable logic devices, and so forth. Alternatively, the named entity generation engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for generating named entities. For example, the exemplary system 100 and the associated named entity generation engine may render generation of named entities by the processes discussed herein. In particular, as will be appreciated by those of ordinary skill in the art, control logic and/or automated routines for performing the techniques and steps described herein may be implemented by the system 100 and the associated named entry generation engine, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
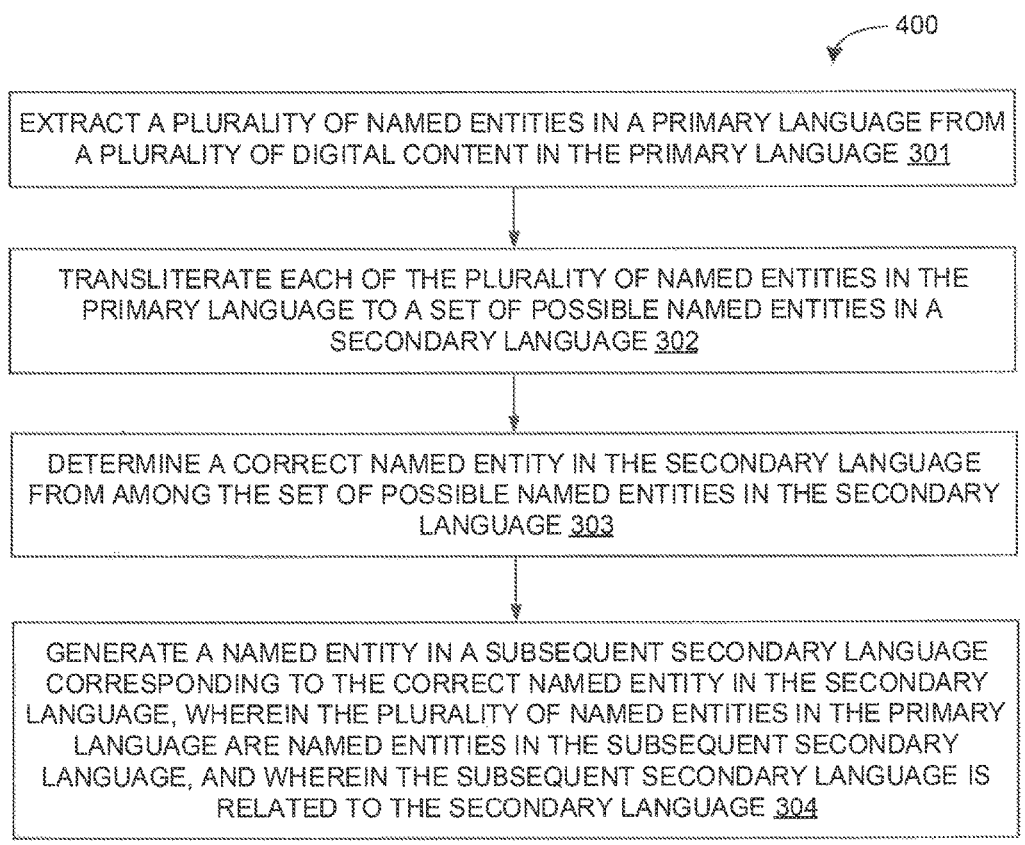
FIG. 3 is a flow diagram of an exemplary process for generating named entities in accordance with some embodiments of the present disclosure.

For example, referring now to FIG. 3, exemplary control logic 300 for generating named entities via a system, such as system 100, is depicted via a flowchart in accordance with some embodiments of the present disclosure. As illustrated in the flowchart, the control logic 300 includes the steps of extracting a plurality of named entities in a primary language from a plurality of digital content in the primary language at step 301, transliterating each of the plurality of named entities in the primary language to a set of possible named entities in a secondary language at step 302, determining a correct named entity in the secondary language from among the set of possible named entities in the secondary language at step 303, and generating a named entity in a subsequent secondary language corresponding to the correct named entity in the secondary language at step 304. It should be noted that each of the plurality of named entities in the primary language may be a named entity in the subsequent secondary language. Further, it should be noted that the subsequent secondary language may be related to the secondary language.

In some embodiments, the primary language is English, the secondary language is Hindi, and the subsequent secondary language is one of a plurality of Indian languages. Additionally, in some embodiments, each of the plurality of named entities comprise at least one of a person, a place, and an organization. Further, in some embodiments, the plurality of named entities in the primary language is extracted at step 301 using a named entity extraction model. In some embodiments, the named entity extraction model is trained by manually tagging an initial plurality of named entities in the primary language in an initial plurality of digital content in the primary language. Further, in some embodiments, the initial plurality of digital content in the primary language are curated from across a plurality of genres, and are relevant to a population versant with the subsequent secondary language.

In some embodiments, each of the plurality of named entities in the primary language is transliterated to the set of possible named entities in the secondary language at step 302 using a plurality of predefined transliteration frameworks. Additionally, in some embodiments, each of the plurality of predefined transliteration frameworks comprise a plurality of pre-defined mapping tables in Unicode values. Further, in some embodiments, each of the plurality of predefined transliteration frameworks comprises at least one of a Harvard-Kyoto transliteration framework, an ISO 15919 transliteration framework, and a simplified customized standard transliteration framework. Further, in some embodiments, each of the plurality of pre-defined mapping tables comprises at least one of a vowels mapping table, a consonants mapping table, and a matras mapping table. Moreover, in some embodiments, transliteration at step 302 comprises the steps of retrieving a sequence of symbols for the primary language for each of the plurality of named entities in the primary language, retrieving a sequence of symbols for the secondary language corresponding to the sequence of symbols for the primary language, and combining the sequence of symbols in the secondary language to generate the set of possible named entities in the secondary language.

In some embodiments, the correct named entity in the secondary language is determined from among the set of possible named entities in the secondary language at step 303 using a long short term memory (LSTM) model based on a confidence score. Additionally, in some embodiments, the LSTM model is trained with a large dataset comprising of a plurality of named entities of the secondary language and a plurality of corresponding transliterated named entities in the primary language. Further, in some embodiments, the named entity in the subsequent secondary language corresponding to the correct named entity in the secondary language is generated at step 304 using a multi-lingual character level tree model.

Figure 4:
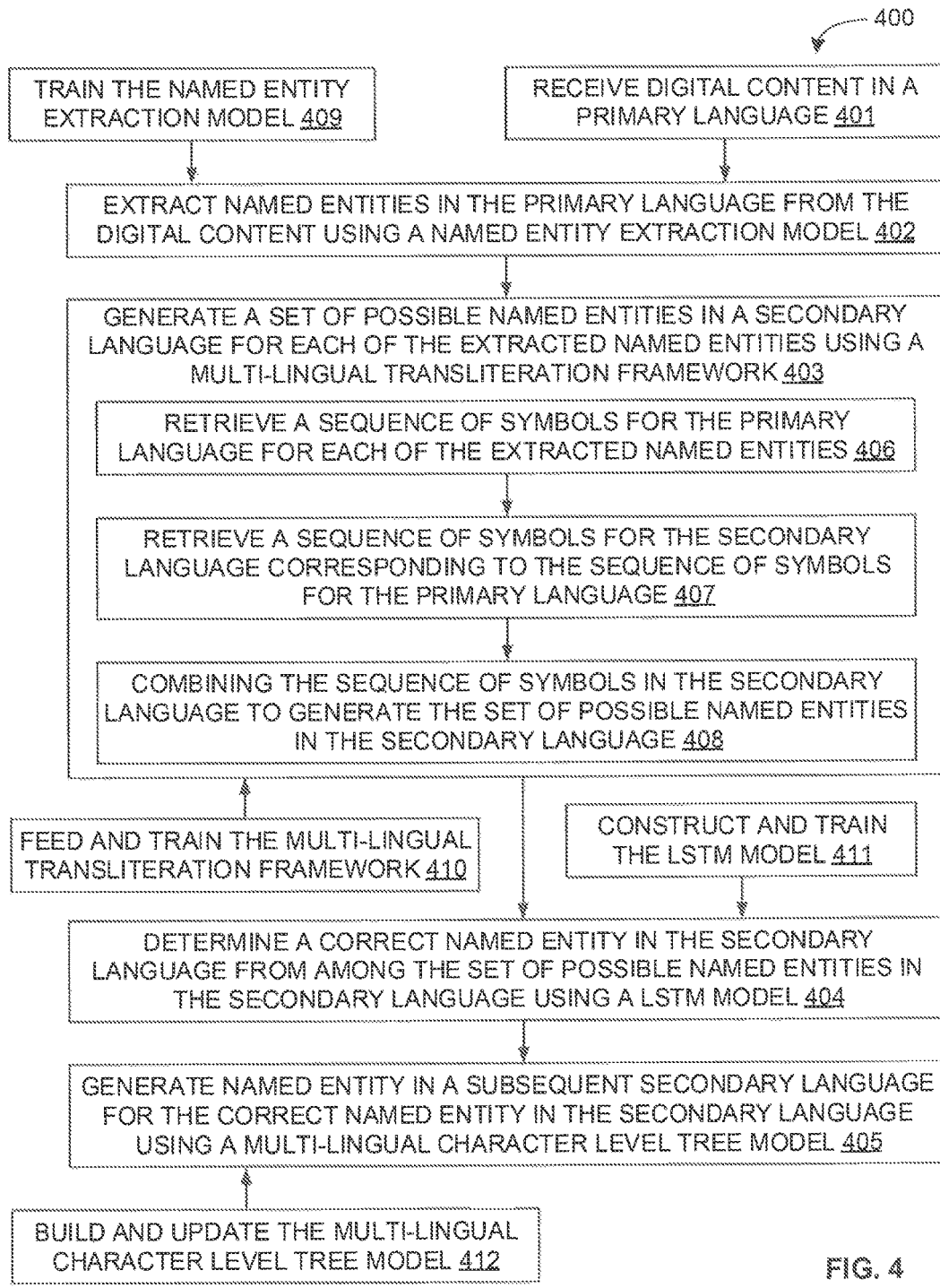
FIG. 4 is a flow diagram of a detailed exemplary process for generating named entities in accordance with some embodiments of the present disclosure.

Referring now to FIG. 4, exemplary control logic 400 for generating named entities is depicted in greater detail via a flowchart in accordance with some embodiments of the present disclosure. As illustrated in the flowchart, the control logic 400 includes the steps of receiving digital content in a primary language from various sources at step 401, extracting named entities in the primary language from the digital content using a named entity extraction model at step 402, generating a set of possible named entities in a secondary language for each of the extracted named entities in the primary language using a multi-lingual transliteration framework at step 403, determining a correct named entity in the secondary language from among the set of possible named entities in the secondary language using a LSTM model at step 404, and generating named entity in a subsequent secondary language for the correct named entity in the secondary language using a multi-lingual character level tree model at step 405.

The step of generating the set of possible named entities in the secondary language at step 403 further includes the steps of retrieving a sequence of symbols for the primary language for each of the named entities in the primary language at step 406, retrieving a sequence of symbols for the secondary language corresponding to the sequence of symbols for the primary language at step 407, and combining the sequence of symbols in the secondary language to generate the set of possible named entities in the secondary language at step 408.

Additionally, the control logic 400 includes the step of training the named entity extraction model by manually tagging named entities in the primary language at step 409. Further, the control logic 400 includes the step of feeding and training multi-lingual transliteration framework at step 410. Further, the control logic 400 includes the step of constructing the LSTM Model, and training the LSTM model with a large dataset of named entities in the secondary language and corresponding transliterated named entities in the primary language at step 411. Moreover, the control logic 400 includes the step of building and regularly building the multi-lingual character level tree model at step 412.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
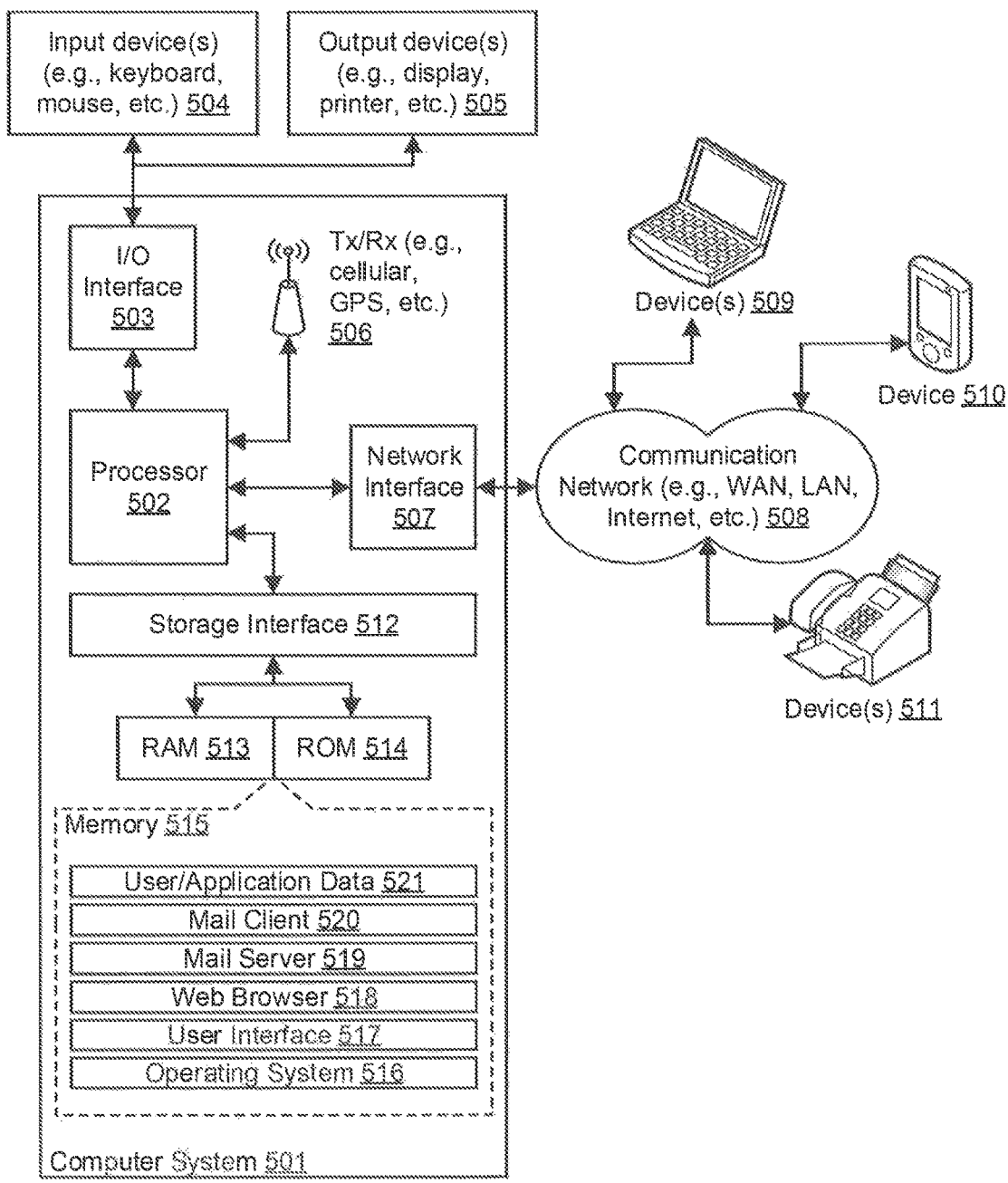
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 and named entity generation engine 200 for generating named entities. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.), collectively referred to as memory 515, via a storage interface 512. The storage interface 512 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 515 may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., digital contents, named entity extraction model, extracted named entities, tagged named entities, transliteration frameworks, pre-defined mapping tables, LSTM model, character level tree model, generated named entities, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for generation of named entities in any language, and in particular Indian languages. The techniques described above enable, identification of various named entities (person, location, organization, etc.) from web sources (e.g., news articles, blogs etc.) in different languages. The techniques described above have application in many of the natural language processing applications. Further, the techniques described in the various embodiments discussed above does-do not require a large data set for all languages unlike the existing named entity recognition systems.

The techniques start with identification of named entities in a primary language (e.g., English) from digital contents in the primary language. The identified entities are then provided to a multi-lingual transliteration framework, which transliterates all the entities into their corresponding language (e.g., Indian languages) using pre-defined mapping tables of languages under consideration (i.e., Indian languages) and the primary language (e.g., English language). The techniques determine many to one relationship between the characters of different languages so as to resolve the ambiguity on deciding which language best fits the disambiguation and has unique values for each alphabet. The processing of English language text for entity extraction ensures wide deployment.

The specification has described system and method for generating named entities. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A method of generating named entities, the method comprising:
   extracting, by a named entity generation engine, a plurality of named entities in a primary language from a plurality of digital content in the primary language;
   transliterating, by the named entity generation engine, each of the plurality of named entities in the primary language to a set of possible named entities in a secondary language;
   determining, by the named entity generation engine, a correct named entity in the secondary language from among the set of possible named entities in the secondary language; and
   generating, by the named entity generation engine, using the correct named entity in the secondary language, a named entity in a subsequent secondary language corresponding to the correct named entity in the secondary language, wherein the generating comprises:
      obtaining, from a multi-lingual character level tree model included in the named entity, generation engine, an index equivalent to an index of the correct named entity in the secondary language, and
      obtaining best sequence of symbols in a plurality of subsequent secondary languages including the subsequent secondary language;
   wherein the plurality of named entities in the primary language are named entities in the subsequent secondary language, and wherein the subsequent secondary language is related to the secondary language.

2. The method of claim 1, wherein the plurality of named entities in the primary language is extracted using a named entity extraction model.

3. The method of claim 2, wherein the named entity extraction model is trained by manually tagging an initial plurality of named entities in the primary language in an initial plurality of digital content in the primary language.

4. The method of claim 3, wherein the initial plurality of digital content in the primary language includes a plurality of genres.

5. The method of claim 1, wherein each of the plurality of named entities comprise at least one of a person, a place, and an organization.

6. The method of claim 1, wherein each of the plurality of named entities in the primary language is transliterated to the set of possible named entities in the secondary language using a plurality of predefined transliteration frameworks, and wherein each of the plurality of predefined transliteration frameworks comprise a plurality of pre-defined mapping tables in Unicode values.

7. The method of claim 6, wherein each of the plurality of predefined transliteration frameworks comprises at least one of a Harvard-Kyoto transliteration framework, an ISO 15919 transliteration framework, and a simplified customized standard transliteration framework, and wherein each of the plurality of pre-defined mapping tables comprises at least one of a vowels mapping table, a consonants mapping table, and a matras mapping table.

8. The method of claim 1, wherein transliteration further comprises:
retrieving a sequence of symbols for the primary language for each of the plurality of named entities in the primary language;
retrieving a sequence of symbols for the secondary language corresponding to the sequence of symbols for the primary language; and
combining the sequence of symbols in the secondary language to generate the set of possible named entities in the secondary language.

9. The method of claim 1, wherein the correct named entity in the secondary language is determined from among the set of possible named entities in the secondary language using a long short term memory (LSTM) model based on a confidence score.

10. The method of claim 9, wherein the LSTM model is trained with a large dataset comprising of a plurality of named entities of the secondary language and a plurality of corresponding transliterated named entities in the primary language.

11. The method of claim 1, further comprising:
outputting at least one of: the named entity in the subsequent secondary language or the named entity in the secondary language.

12. The method of claim 1, wherein the primary language is English, wherein the secondary language is Hindi, and the subsequent secondary language is one of a plurality of Indian languages.

13. A system for generating named entities, the system comprising:
at least one processor; and
a computer-readable medium storing instructions that, when executed by the at least one processor, cause the at least one processor to perform operations comprising:
extracting a plurality of named entities in a primary language from a plurality of digital content in the primary language;
transliterating each of the plurality of named entities in the primary language to a set of possible named entities in a secondary language;
determining a correct named entity in the secondary language from among the set of possible named entities in the secondary language; and
generating, using the correct named entity in the secondary language, a named entity in a subsequent secondary language corresponding to the correct named entity in the secondary language, wherein the generating comprises:
obtaining, from a multi-lingual character level tree model included in the named entity generation engine, an index equivalent to an index of the correct named entity in the secondary language, and
obtaining a best sequence of symbols in a plurality of subsequent secondary languages including the subsequent secondary language;
wherein the plurality of named entities in the primary language are named entities in the subsequent secondary language, and wherein the subsequent secondary language is related to the secondary language.

14. The system of claim 13, wherein the plurality of named entities in the primary language is extracted using a named entity extraction model.

15. The system of claim 14, wherein the named entity extraction model is trained by manually tagging an initial plurality of named entities in the primary language in an initial plurality of digital content in the primary language, and wherein the initial plurality of digital content in the primary language includes a plurality of genres.

16. The system of claim 13, wherein each of the plurality of named entities in the primary language is transliterated to the set of possible named entities in the secondary language using a plurality of predefined transliteration frameworks, and wherein each of the plurality of predefined transliteration frameworks comprise a plurality of pre-defined mapping tables in Unicode values.

17. The system of claim 16, wherein each of the plurality of predefined transliteration frameworks comprises at least one of a Harvard-Kyoto transliteration framework, an ISO 15919 transliteration framework, and a simplified customized standard transliteration framework, and wherein each of the plurality of pre-defined mapping tables comprises at least one of a vowels mapping table, a consonants mapping table, and a matras mapping table.

18. The system of claim 13, wherein transliteration further comprises:
retrieving a sequence of symbols for the primary language for each of the plurality of named entities in the primary language;
retrieving a sequence of symbols for the secondary language corresponding to the sequence of symbols for the primary language; and
combining the sequence of symbols in the secondary language to generate the set of possible named entities in the secondary language.

19. The system of claim 13, wherein the correct named entity in the secondary language is determined from among the set of possible named entities in the secondary language using a long short term memory (LSTM) model based on a confidence score, and wherein the LSTM model is trained with a large dataset comprising of a plurality of named entities of the secondary language and a plurality of corresponding transliterated named entities in the primary language.

20. The system of claim 13, wherein the instructions, further cause the at least one processor to perform operation of:

outputting at least one of: the named entity in the subsequent secondary language or the named entity in the secondary language.

21. A non-transitory computer-readable medium storing computer-executable instructions for:
- extracting a plurality of named entities in a primary language from a plurality of digital content in the primary language;
- transliterating each of the plurality of named entities in the primary language to a set of possible named entities in a secondary language;
- determining a correct named entity in the secondary language from among the set of possible named entities in the secondary language; and
- generating, using the correct named entity in the secondary language, a named entity in a subsequent secondary language corresponding to the correct named entity in the secondary language, wherein the generating comprises:
  - obtaining, from a multi-lingual character level tree model included in the named entity generation engine, an index equivalent to an index of the correct named entity in the secondary language, and
  - obtaining a best sequence of symbols in a plurality of subsequent secondary languages including the subsequent secondary language;
- wherein the plurality of named entities in the primary language are named entities in the subsequent secondary language, and wherein the subsequent secondary language is related to the secondary language.

* * * * *